United States Patent
Wu

(10) Patent No.: US 8,483,213 B2
(45) Date of Patent: Jul. 9, 2013

(54) ROUTING DEVICE AND RELATED CONTROL CIRCUIT

(75) Inventor: Pei-Lin Wu, Hsinchu (TW)

(73) Assignee: Gemtek Technology Co., Ltd., Hsinchu (TW)

( * ) Notice: Subject to any disclaimer, the term of this patent is extended or adjusted under 35 U.S.C. 154(b) by 539 days.

(21) Appl. No.: 12/774,946

(22) Filed: May 6, 2010

(65) Prior Publication Data

US 2011/0216777 A1    Sep. 8, 2011

(51) Int. Cl.
 *H04L 12/28*    (2006.01)
 *G06F 15/173*    (2006.01)
 *G06F 15/16*    (2006.01)
 *G06F 11/00*    (2006.01)

(52) U.S. Cl.
 USPC ............ 370/389; 709/223; 709/245; 726/22; 726/23

(58) Field of Classification Search
 None
 See application file for complete search history.

(56) References Cited

U.S. PATENT DOCUMENTS

| | | | |
|---|---|---|---|
| 6,249,780 B1 * | 6/2001 | Mizokawa | 706/23 |
| 7,016,352 B1 * | 3/2006 | Chow et al. | 370/392 |
| 7,234,163 B1 * | 6/2007 | Rayes et al. | 726/22 |
| 7,464,183 B1 * | 12/2008 | Ioffe et al. | 709/245 |
| 7,562,390 B1 | 7/2009 | Kwan | |
| 7,567,573 B2 * | 7/2009 | Foss | 370/395.54 |
| 7,929,543 B2 * | 4/2011 | Miyata | 370/395.21 |
| 2006/0209818 A1 * | 9/2006 | Purser | 370/389 |
| 2007/0153738 A1 * | 7/2007 | Barker et al. | 370/331 |
| 2007/0297349 A1 * | 12/2007 | Arkin | 370/255 |
| 2008/0080496 A1 * | 4/2008 | Slaight | 370/389 |
| 2008/0101381 A1 * | 5/2008 | Sun et al. | 370/395.54 |
| 2009/0307773 A1 * | 12/2009 | Kwan | 726/23 |
| 2010/0107250 A1 * | 4/2010 | Li | 726/22 |

\* cited by examiner

*Primary Examiner* — Hassan Phillips
*Assistant Examiner* — Hicham Foud
(74) *Attorney, Agent, or Firm* — Birch, Stewart, Kolasch & Birch, LLP

(57) ABSTRACT

A control circuit for use in a routing device includes an input/output interface, and a processor coupled with the input/output interface for setting address resolution information of a network protocol address of a first network section as unchangeable if the network address at least once accessed other network sections and complies with a predetermined condition.

16 Claims, 8 Drawing Sheets

FIG. 4

| Network protocol address 410 | Physical address 420 | Connection port 430 | Last accessing time 440 | Number of established sessions/sockets 450 | Indicator 460 |
|---|---|---|---|---|---|
| IP_122 | MAC_122 | Port_1 | Ta | Count_122 | 1 |
| IP_124 | MAC_124 | Port_2 | Tb | Count_124 | 0 |
| IP_126 | MAC_126 | Port_3 | Tc | Count_126 | 0 |
| ... | | | | | |

400, 402, 404, 406

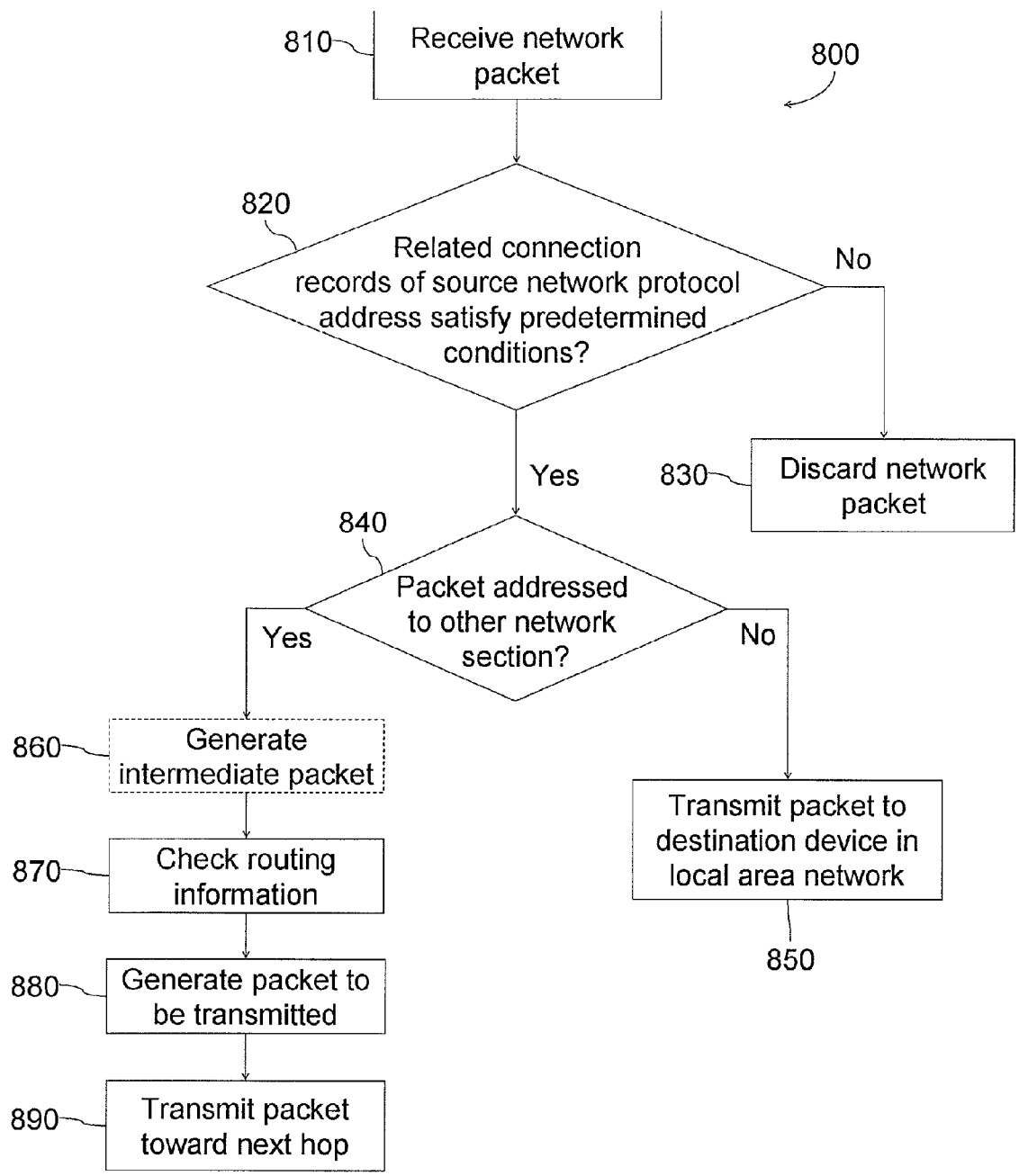

ROUTING DEVICE AND RELATED CONTROL CIRCUIT

BACKGROUND OF THE INVENTION

1. Field of the Invention

The present invention relates to network communication apparatuses, and more particularly, to routing devices and related control circuits with enhanced defense capability against network address resolution protocol (ARP) attacks.

2. Description of Related Art

Address Resolution Protocol (ARP) information plays an important role in Ethernet communications, but attackers or malicious programs could easily poison the ARP information of the terminal devices or the routing device in the local area network by using so-called ARP spoofing means.

Since the routing device is the key equipment for data communications between the local area network and other network sections, the terminal devices in the local area network would become unable to communicate with other network sections (such as Internet) once the ARP information stored in the routing device is poisoned by the ARP attacks.

To avoid the ARP information stored in the routing device from being poisoned by the ARP attacks, one conventional solution requires the network administrator to personally configure and input each network address resolution entry for the routing device. However, this approach is not practical in many network environments. For example, in network environments where the network protocol addresses are dynamically assigned, in wireless network environments where the terminal devices often change their locations, or in network environments with numerous terminal devices or complex topology, it is obviously unrealistic to require the network administrator to manually input numerous ARP entries to the routing device, especially those ARP entries may need to be updated frequently.

SUMMARY OF THE INVENTION

In view of the foregoing, it can be appreciated that a substantial need exists for methods and apparatuses that can improve the routing devices' defense capability against ARP attacks.

An exemplary embodiment of a control circuit for use in a routing device is disclosed. The control circuit comprises: an input and output interface; and a processor coupled with the input and output interface; wherein when the processor received a network address resolution packet containing network address resolution information of a network protocol address of a first network section different from that recorded in the routing device, the processor does not update the network address resolution information of the network protocol address if the network protocol address has at least once accessed other network sections and satisfies a predetermined condition; wherein the predetermined condition is selected from a group consisting of: (a) the time at which the network address resolution packet is received is less than a predetermined time length away from the time at which the network protocol address last accessed other network sections; (b) the network protocol address accesses other network sections at a connection frequency that reaches a predetermined frequency; and (c) the network protocol address previously accessed other network section through a physical connection port through which the network address resolution packet is received.

An exemplary embodiment of a control circuit for use in a routing device is disclosed comprising: an input and output interface; and a processor coupled with the input and output interface for setting network address resolution information of a network protocol address of a first network section as unchangeable if the network protocol address has accessed other network sections more than once and complies with a predetermined condition; wherein the predetermined condition is selected from a group consisting of: (a) the network protocol address accesses other network sections at a connection frequency that reaches a predetermined frequency; and (b) the network protocol address has accessed other network sections for a predetermined times or more.

An exemplary embodiment of a routing device is disclosed comprising: a control circuit for, when receiving a first network packet, generating a second network packet having a destination network protocol address identical to that of the first network packet and having a source physical address identical to a physical address of the routing device if the first network packet has a source network protocol address within a first network section, a destination network protocol address addressed to a second network section, and a destination physical address different from the physical address of the routing device, and the source network protocol address satisfies a predetermined condition; wherein the predetermined condition is selected from a group consisting of: (a) the time at which the first network packet is received is less than a predetermined time length away from the time at which the source network protocol address last accessed other network sections; (b) the source network protocol address accesses other network sections at a connection frequency that reaches a predetermined frequency; (c) the source network protocol address has accessed other network sections for a predetermined times or more; and (d) the source network protocol address previously accessed other network section through a physical connection port through which the first network packet is received.

One advantage of the disclosed embodiments is that the ability to recognize forged network address resolution packets is greatly improved and thereby increasing the alerting and defense capability against network address resolution protocol (ARP) attacks.

Another advantage of the disclosed embodiments is that the routing device is able to dynamically determine whether to allow amendment to the network resolution information of respective network protocol addresses without involving the network administrator, and thus can be applied in various network environments.

Another advantage of the disclosed embodiments is that the routing device is able to rapidly determine whether a received network packet is valid by simply analyzing the related connection records of the source network protocol address of the received network packet. The routing device then decides the following actions accordingly and needs not to consume considerable computing resource to exam the payload of the network packet. As a result, the network security can be effectively improved.

Another advantage of the disclosed embodiments is that the routing device is able to maintain the communications between a terminal device and other network sections even if the terminal device's network address resolution information was poisoned by ARP attacks. The threats of the ARP attacks can therefore be effectively reduced.

It is to be understood that both the foregoing general description and the following detailed description are exemplary and explanatory only and are not restrictive of the invention, as claimed.

BRIEF DESCRIPTION OF THE DRAWINGS

FIG. 4 is the related connection records of specific network protocol addresses according to an exemplary embodiment.

FIG. 8 is a flowchart illustrating a method for processing network packets in accordance with an exemplary embodiment.

DETAILED DESCRIPTION

Reference will now be made in detail to exemplary embodiments of the invention, which are illustrated in the accompanying drawings. The same reference numbers may be used throughout the drawings to refer to the same or like parts or operations.

Certain terms are used throughout the description and following claims to refer to particular components. As one skilled in the art will appreciate, vendors may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ." Also, the phrase "coupled with" is intended to compass any indirect or direct connection. Accordingly, if this document mentioned that a first device is coupled with a second device, it means that the first device may be directly connected to the second device (including through an electrical connection or other signal connections, such as wireless communications or optical communications), or indirectly connected to the second device through an indirect electrical connection or signal connection via other intermediate device or connection means.

Figure 1:
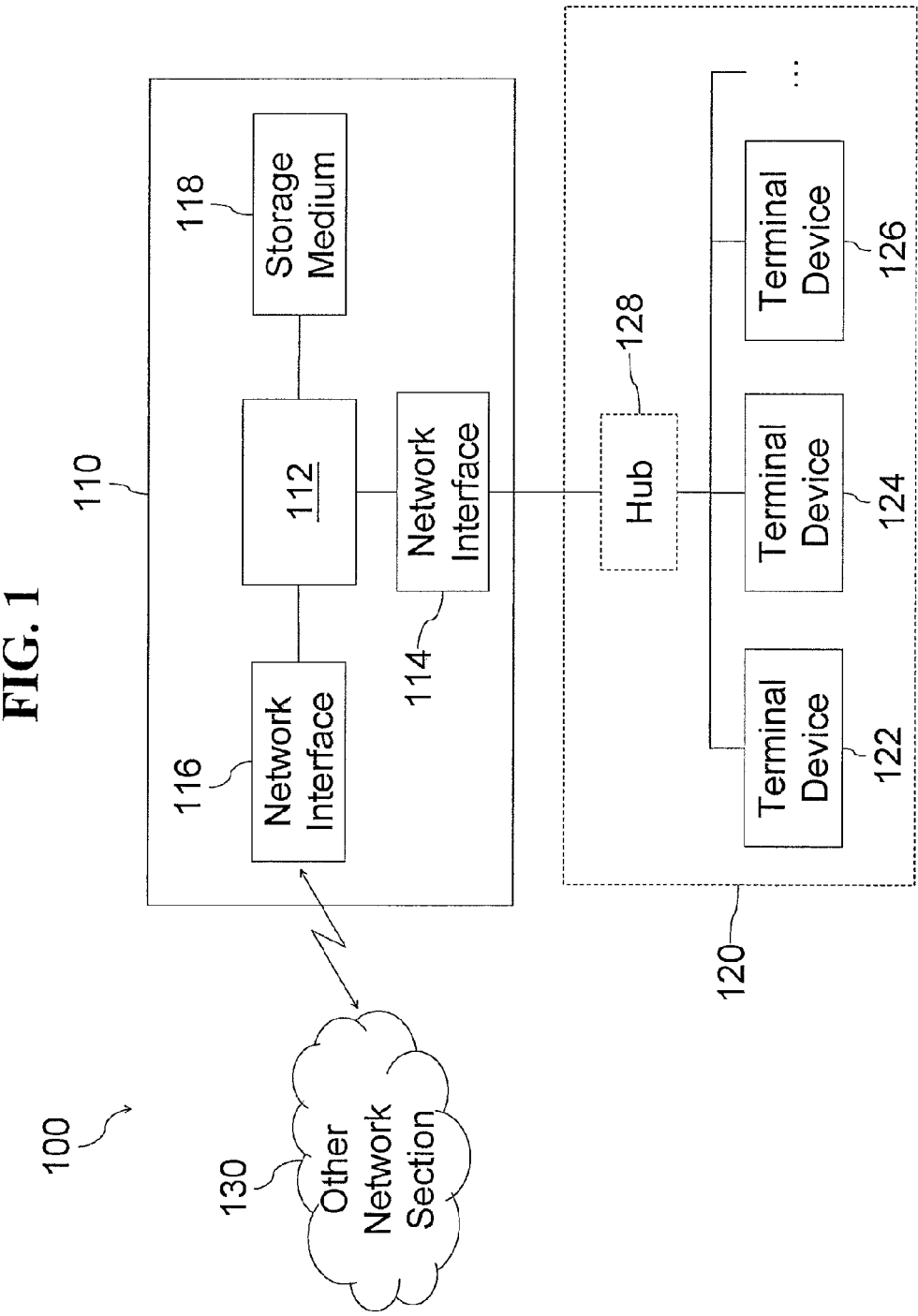
FIG. 1 is a simplified block diagram of a network system in accordance with an exemplary embodiment.

FIG. 1 shows a simplified block diagram of a network system 100 in accordance with an exemplary embodiment. In the network system 100, a routing device (also referred to as a communication gateway) 110 is the communication bridge between a local area network 120 and other network section (e.g., Internet) 130. The routing device 110 of this embodiment comprises a control circuit 112, a network interface 114 for communicating with the local area network 120, a network interface 116 for communicating with other network section 130, and a storage medium 118. In implementations, the routing device 110 may be dedicated network equipment, or may be implemented by installing a software program or operation system with packet routing/forwarding function into a computer.

The communications between the routing device 110 and the local area network 120 and the communications between the routing device 110 and other network section 130 can be implemented by either wired or wireless transmission approaches. Thus, the network interface 114 and the network interface 116 may be wired network interfaces or wireless communication interfaces. The storage medium 118 is utilized for storing routing information and network address resolution information required for the operations of the routing device 110. The storage medium 118 may be implemented by storage devices built in the routing device 110, external storage devices, or the combination of above.

As shown in FIG. 1, the local area network 120 comprises multiple terminal devices (terminal devices 122, 124, and 126 are shown as examples). These terminal devices may be cell-phone, computer, PDA, set-top box, game station or other equipments capable of accessing network. In implementations, the multiple terminal devices in the local area network 120 may be communicated with each other via one or more hubs (or switch) 128 using wired or wireless transmission means to constitute a more complex or larger local area network environment, and coupled with the network interface 114 of the routing device 110.

Hereinafter, operations of the routing device 110 will be further described with reference to FIG. 2 and FIG. 3.

Figure 2:
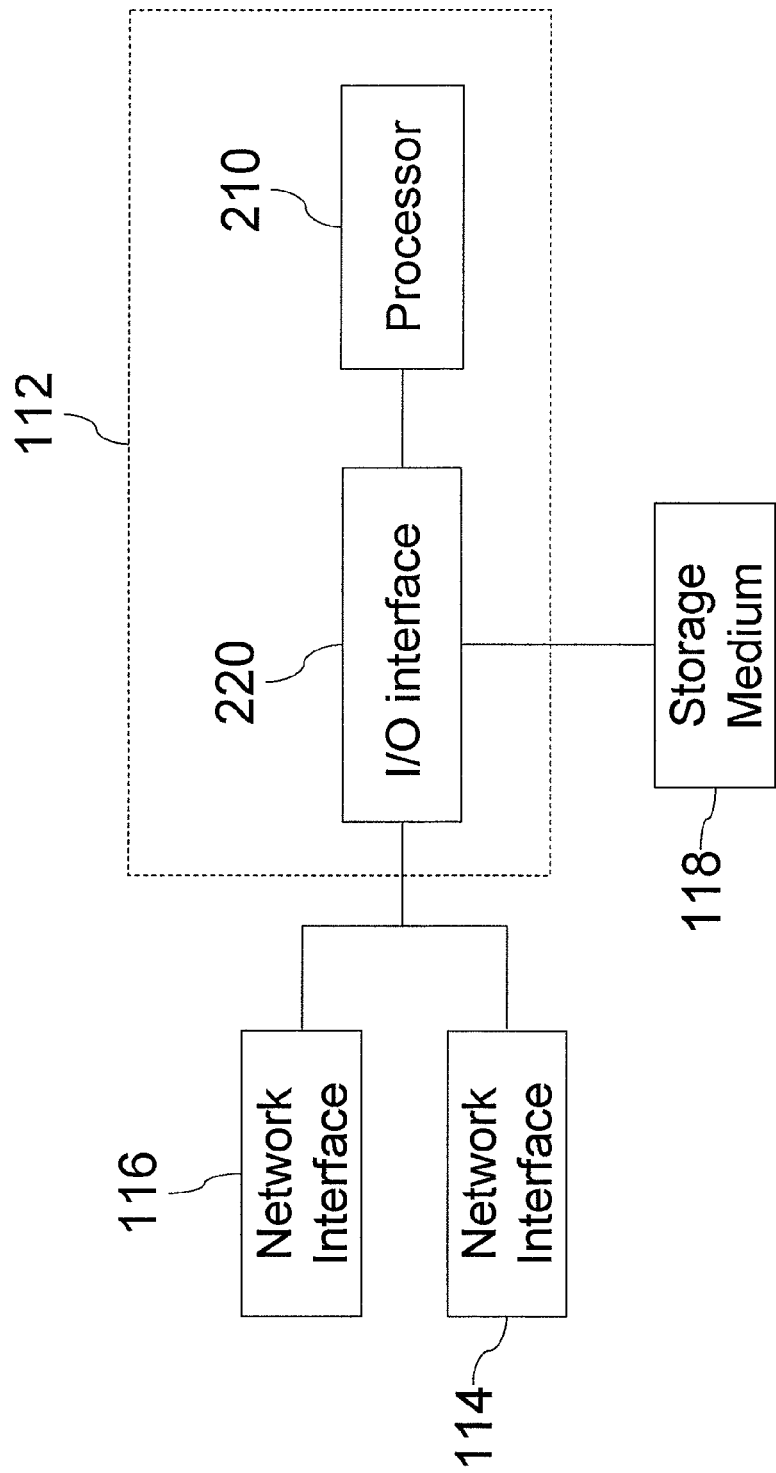
FIG. 2 is a simplified block diagram of the control circuit of FIG. 1 in accordance with an exemplary embodiment.

FIG. 2 is a simplified block diagram of the control circuit 112 in accordance with an exemplary embodiment. In this embodiment, the control circuit 112 comprises a processor 210 and an input and output interface 220. The input and output interface 220 is coupled with the network interface 114, the network interface 116, and the storage medium 118 of the routing device 110, for transmitting data among the processor 210, the network interfaces 114, 116, and the storage medium 118.

Figure 3:
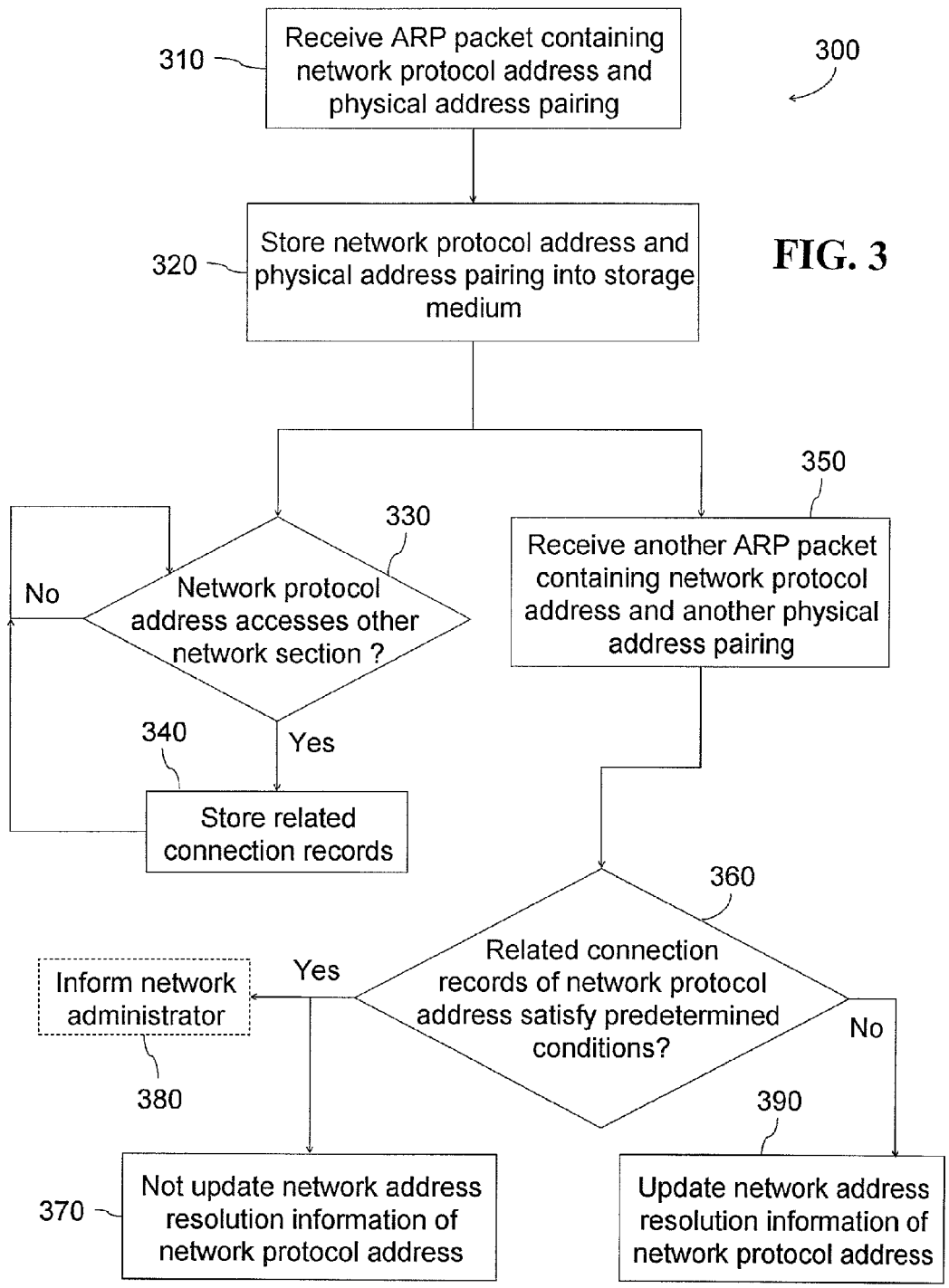
FIG. 3 is a flowchart illustrating a method for managing network address resolution information in accordance with an exemplary embodiment.

FIG. 3 shows a flowchart 300 illustrating a method for managing network address resolution information in accordance with an exemplary embodiment.

In an operation 310, when the routing device 110 begins to establish connections with the local area network 120, the processor 210 of the control circuit 112 obtains physical address (e.g., MAC address) and network protocol address (e.g., IPv4 address or IPv6 address) pairing information of respective terminal devices in the local area network 120 through the network address resolution packets (e.g., ARP request packets or ARP reply packets) transmitted from the terminal devices. It is assumed hereafter that the routing device 110 has a physical address MAC_110 and a network protocol address IP_110; the terminal device 122 has a physical address MAC_122 and a network protocol address IP_122; the terminal device 124 has a physical address MAC_124 and a network protocol address IP_124; and the terminal device 126 has a physical address MAC_126 and a network protocol address IP_126. In general, IP_122, IP_124, and IP_126 are within the same network section.

For illustrative purpose, it is assumed hereafter that the IP_122 and MAC_122 pairing information of the terminal device 122 stored in the routing device 110 is set by the network administrator, and the processor 210 receives a network address resolution packet ARP_124 containing the MAC_124 and IP_124 pairing transmitted from the terminal device 124 and a network address resolution packet ARP_126 containing the MAC_126 and IP_126 pairing transmitted from the terminal device 126 in the operation 310.

Then, the processor 210 performs an operation 320 to store the network protocol address and physical address pairing information contained in the network address resolution packets ARP_124 and ARP_126 into the storage medium 118 to establish an initial network address resolution information for the routing device 110.

As mentioned previously, attackers or malicious programs could easily poison the ARP information stored in the routing device by using forged network address resolution packets. Conventional routing devices are unable to determine whether a received network address resolution packet is true or false, and thus can not effectively defend the ARP attacks.

In order to improve the routing device's defense capability against ARP attacks, the processor 210 of the control circuit 112 performs an operation 330 to monitor the pattern of network accessing with respect to other network sections (such as Internet) for respective network protocol addresses within the local area network 120 after the initial network address resolution information of the routing device 110 is established Each time the processor 210 detects that one network protocol address in the local area network 120 is accessing to other network section (e.g., a network session/socket between the network protocol address and other network section 130 is successfully established), the processor 210 performs an operation 340 to store related connection records of the network protocol address into the storage medium 118 as the basis for determining validity of subsequent network address resolution packets.

For example, FIG. 4 shows a connection recording table 400 which is the related connection records stored in the storage medium 118 according to an exemplary embodiment. In this embodiment, the processor 210 records the network protocol address and physical address pairing information (such as the IP_124 and MAC_124 pairing) received in the operation 310 in columns 410 and 420 of the connection recording table 400, respectively. As shown in FIG. 4, each row of the connection recording table 400 stores related connection records for a specific network protocol address. For example, a row 402 is for storing the related connection records between the network protocol address IP_122 (which suppose to be the network protocol address of the terminal device 122 in normal situation) and other network sections, and a row 404 is for storing the related connection records between the network protocol address IP_124 (which suppose to be the network protocol address of the terminal device 124 in normal situation) and other network sections.

For each row of the connection recording table 400, a column 430 is for storing the sequential number of a physical connection port on the network interface 114 through which the specific network protocol address last accessed to other network sections. A column 440 is for storing a time point at which the specific network protocol address last accessed to other network sections. A column 450 is for storing a number of sessions/sockets that were once established between the specific network protocol address and other network sections (not limited to the same network section), such as an accumulated numbers of sessions/sockets that were once successfully established between the specific network protocol address and other network section 130.

In implementations, the processor 210 may have multiple options to determine the time point at which the specific network protocol address is accessing to other network section 130. A number of embodiments will be described in the following with reference to the examples shown in FIG. 5 and FIG. 6.

Figure 5:
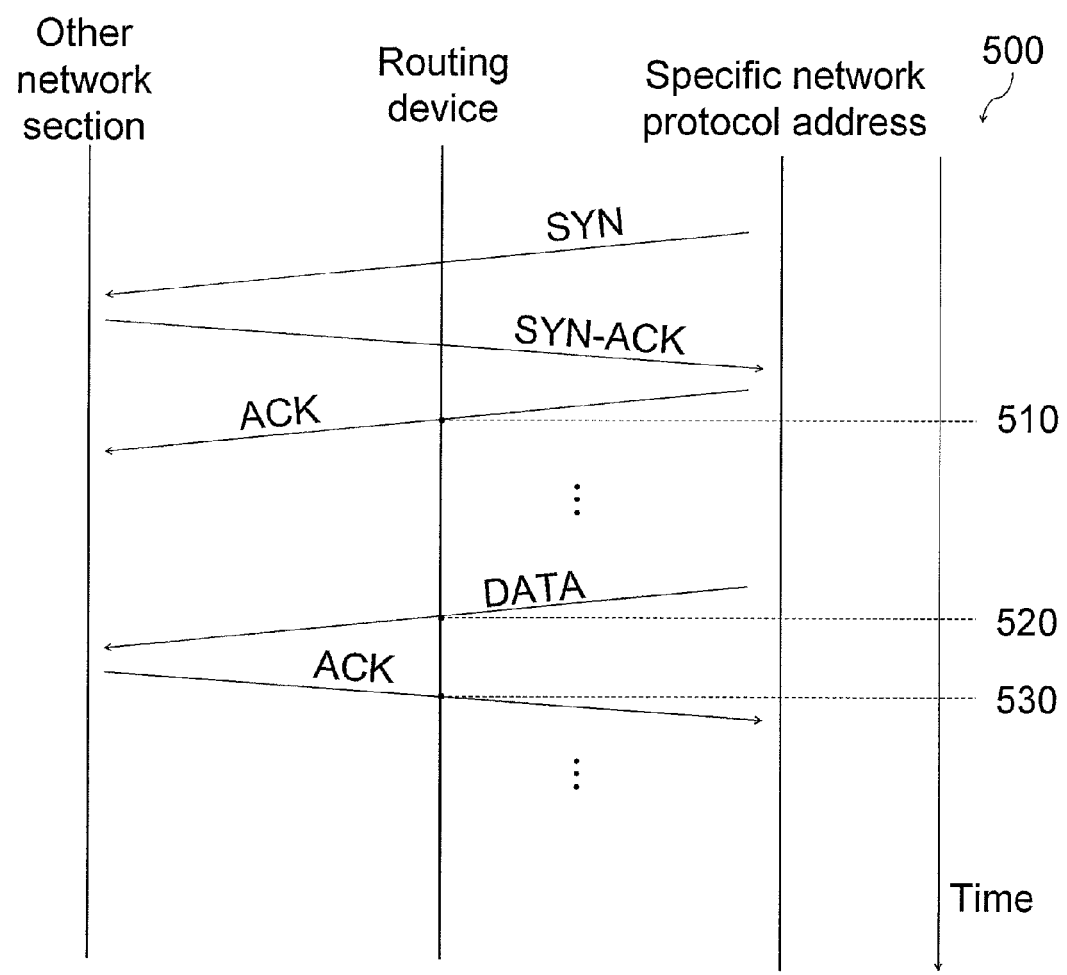
FIG. 5 is a schematic diagram illustrating data transmission between a specific network protocol address and other network section through TCP communication protocol according to an exemplary embodiment.

FIG. 5 shows a schematic diagram 500 illustrating data transmission between a specific network protocol address and other network section 130 through TCP (Transmission Control Protocol) communication protocol according to an exemplary embodiment. As shown in FIG. 5, when the specific network protocol address wants to access a destination device in other network section 130, the specific network protocol address establishes a session with the destination device through a three-way handshaking procedure, and then the data transmission stage begins. In one embodiment, the processor 210 records a time point 510 at which the specific network protocol address issues an acknowledge (ACK) packet during the three-way handshaking procedure, and utilizes the time point 510 as the time point that the specific network protocol address accesses other network section 130.

In another embodiment, the processor 210 records a time point at which the N-th data transmission between the specific network protocol address and the destination device is carried out during the data transmission stage (such as a time point 520 at which the specific network protocol address issues the N-th data packet or a time point 530 at which the specific network protocol address receives the N-th data acknowledge packet from the destination device), and utilizes it as the time point that the specific network protocol address accesses other network section 130. The value of N may be adjusted based on the design requirement. In addition, the processor 210 may instead utilize the time point at which the data transmission between the specific network protocol address and the destination device is finished as the time point that the specific network protocol address accesses other network section 130.

Figure 6:
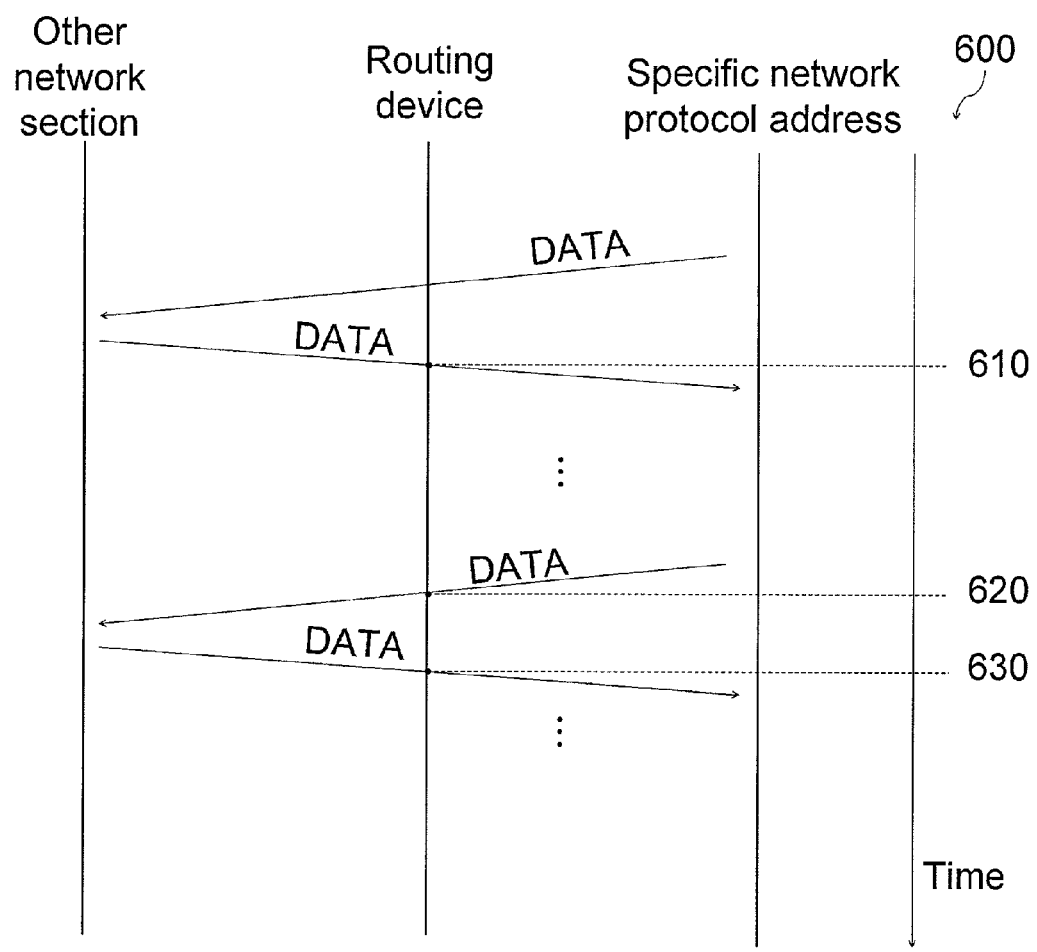
FIG. 6 is a schematic diagram illustrating data transmission between a specific network protocol address and other network section through UDP communication protocol according to an exemplary embodiment.

FIG. 6 shows a schematic diagram 600 illustrating data transmission between a specific network protocol address and other network section 130 through UDP (User Datagram Protocol) communication protocol according to an exemplary embodiment. Since UDP transmission is not a connection-oriented protocol, there is no three-way handshaking procedure when the specific network protocol address wants to establish a socket with a destination device in other network section 130, and the data receiving end would not issue acknowledge (ACK) packet when received a data packet. In this situation, the processor 210 may record a time point 610 at which the first corresponding data packet transmitted from the destination device is received after the specific network protocol address issued a data packet, and utilizes the time point 610 as the time point that the specific network protocol address accesses to other network section 130. In implementations, the processor 210 may determine that a data packet transmitted from the destination device corresponds to a data packet transmitted from the specific network protocol address when the source port and destination port information of the data packet from the destination device are the same as that of the data packet issued from the specific network protocol address.

In other embodiments, the processor 210 may instead utilize a time point at which the M-th data packet from the specific network protocol address is received or a time point 630 at which the P-th corresponding data packet from the destination device is received as the time point that the specific network protocol address accesses to other network section 130.

Each time the processor 210 detects a session/socket between the specific network protocol address and other network section is successfully established, the processor 210 increases the value stored in a column 450 of the connection recording table 400 corresponding to the specific network protocol address by one to represent the accumulated numbers of sessions/sockets that were ever successfully established between the specific network protocol address and other network sections (not limited to the same network section).

In some situations or applications, the network administrator may personally configure and input the network address resolution information of some network protocol addresses (such as IP_122) into the routing device 110. Thus, the processor 210 may set an indicator, such as a flag, in a column 460 of the connection recording table 400 to represent whether the network address resolution information of a specific network protocol address was set by the network administrator. In one embodiment, the processor 210 set the column 460 of the row 402 to 1 to represent that the network address resolution information of the network protocol address IP_122 stored in the routing device 110 was set by the network administrator personally. In addition, the processor 210 set the column 460 of the row 404 and the row 406 to 0 to represent that their network address resolution information stored in the routing device 110 are obtained through the network address resolution packets received by the routing device 110, not set by the network administrator.

In implementations, the processor 210 may continuously repeat the operation 330 and the operation 340 to update the content of the connection recording table 400.

On the other hand, in subsequent operations, the routing device 110 may receive other network address resolution packet containing network address resolution information different from the records stored in the storage medium 118 (operation 350). For example, assuming that the routing device 110 in the operation 350 receives a network address resolution packet ARP_N having a sender network protocol address IP_124 and a sender physical address MAC_N, i.e., the network address resolution information of the network protocol address IP_124 contained in the network address resolution packet ARP_N (i.e., the IP_124 and MAC_N pairing) is different from the IP_124 and MAC_124 pairing stored in the routing device 110. In this situation, the processor 210 proceeds to an operation 360.

According to experience, most users in various network environments have a common behavior pattern of network utilization. That is, people have a tendency to frequently connect to Internet or other network sections to access web pages or data for various reasons such as working, learning, entertainment, engaging social activities, or killing time. Thus, the processor 210 analyzes whether the related connection records of the network protocol address IP_124 stored in the connection recording table 400 satisfies one or more predetermined conditions corresponding to the user behavior pattern of normal network utilization in the operation 360.

In one embodiment, the predetermined condition corresponding to the user behavior pattern of normal network utilization is that the network protocol address IP_124 accesses other network section 130 (such as Internet) at a connection frequency that reaches a predetermined frequency, such as once per 10 minutes, three times per hour, twice per three hours, or the like. The term "connection frequency" is also known as the number of total connections established between the network protocol address IP_124 and other network section 130 in a unit of time. The predetermined frequency may be adjusted by the network administrator based on the practical network environment. Accordingly, the processor 210 analyzes whether the connection frequency between the network protocol address IP_124 and other network section 130 (such as Internet) reaches the predetermined frequency in the operation 360. In implementations, the processor 210 may add a column into the connection recording table 400 to store the calculating result of connection frequency in the operation 340, and simply determines whether the value of the column reaches or is greater than the predetermined frequency in the operation 360. If the determining result is positive, the processor 210 determines that the user behavior pattern of network utilization of the network protocol address IP_124 matches the user behavior pattern of normal network utilization. Therefore, the processor 210 determines that the network address resolution packet ARP_N containing network address resolution information different from that stored in the storage medium 118 is an invalid packet.

Alternatively, the processor 210 may calculate the time interval between the time at which the network address resolution packet ARP_N is received and a time point Tb at which the network protocol address IP_124 last accessed other network section 130 by subtracting the last accessing time Tb corresponding to the network protocol address IP_124 stored in a column 440 of the connection recording table 400 from the system time at which the network address resolution packet ARP_N is received. The reciprocal of the calculated result can be regarded as a form of connection frequency. For example, assuming the calculated result is 10 minutes, it means that the time at which the network address resolution packet ARP_N is received is 10 minutes away from the time point Tb at which the network protocol address IP_124 last accessed other network section, and the processor 210 could interpret it as that the recent connection frequency of the network protocol address IP_124 is once per 10 minutes. Accordingly, the processor 210 may determine whether the time at which the network address resolution packet ARP_N is received is less than a predetermined time length away from the time at which the network protocol address IP_124 last accessed other network sections based on the last accessing time Tb stored in the column 440 of the row 404 in the operation 360. If the determining result is positive, it means that the user behavior pattern of network utilization of the network protocol address IP_124 matches the user behavior pattern of normal network utilization. Therefore, the processor 210 determines that the network address resolution packet ARP_N is an invalid packet.

Additionally, in some network environments, the connection between the terminal device and the routing device 110 is implemented by wired cable, and the connection between respective terminal device and the physical connection port on the network interface 114 of the routing device 110 is fixed and will not be changed. Under this situation, the predetermined condition corresponding to the user behavior pattern of normal network utilization is that a physical connection port through which the network protocol address IP_124 previously established session/socket with other network sections is the same as the physical connection port through which the routing device 110 received a normal network address resolution packet from the network protocol address IP_124. Thus, the processor 210 may determine whether the physical connection port through which the network address resolution packet ARP_N is received is the same as a physical connection port Port_2 through which the network protocol address IP_124 previously accessed other network section. If they are different, it means that the network address resolution packet ARP_N may be a forged network address resolution packet, and thus the processor 210 determines that the network address resolution packet ARP_N is an invalid packet.

In another embodiment, the predetermined condition corresponding to the user behavior pattern of normal network utilization is that the network protocol address IP_124 accesses other network section 130 (such as Internet) for a predetermined times or more, such as five times, ten times, etc. The number of the predetermined times can be adjusted by the network administrator based on the practical network environment. Accordingly, the processor 210 may analyze whether the number of established sessions/sockets Count_124 stored in the column 450 of the row 404 reaches the predetermined times in the operation 360. If the value of the Count_124 reaches the predetermined times, it means that the user behavior pattern of network utilization of the network protocol address IP_124 matches the user behavior pattern of normal network utilization, and thus the processor 210 determines that the network address resolution packet ARP_N is an invalid packet.

Additionally, in the network environments where the network administrator personally configured and inputted the network address resolution information of some specific network protocol addresses into the routing device 110, it is supposed that the network address resolution information of these specific network protocol addresses will not change. Thus, the processor 210 may determine whether a received network address resolution packet is valid according to the value of the column 460 of the connection recording table 400 in the operation 360. Assuming that the routing device 110 in the operation 350 received a network address resolution packet ARP_Y having a sender network protocol address IP_122 and a sender physical address MAC_Y, i.e., the network address resolution information of the network protocol address IP_122 contained in the network address resolution packet ARP_Y (i.e., the IP_122 and MAC_Y pairing) is different from the IP_122 and MAC_122 pairing stored in the routing device 110. In the operation 360, the processor 210 could understand that the network address resolution information of the network protocol address IP_122 in the routing device 110 was set by the network administrator according to the value of the column 460 of the row 402 (which is one in this case). Since the network address resolution information of the network protocol address IP_122 contained in the network address resolution packet ARP_Y is inconsistent with the existing entry set by the network administrator, the processor 210 determines that the network address resolution packet ARP_Y is an invalid packet.

In implementations, the processor 210 may be designed to conduct two or more analyses described above in the operation 360 to improve the accuracy in determining validity of a received network address resolution packet.

The connection recording table 400 in the foregoing embodiments is used for storing related connection records between each network protocol address of interest and other network sections. The function of the connection recording table 400 is different from that of the ARP cache (such as ARP table) required for the operations of the routing device 110. Accordingly, the connection recording table 400 and the ARP cache required for the operations of the routing device 110 may be stored in different segments of the storage medium 118. In implementations, the processor 210 may generate the ARP cache required for the operations of the routing device 110 based on the content of the connection recording table 400.

If the analyzing result of the processor 210 in the operation 360 is that the received network address resolution packet is an invalid packet, the processor 210 would not update the ARP cache stored in the storage medium 118 (operation 370). In one embodiment, the processor 210 further perform an operation 380 in this situation to issue a warning notice to inform the network administrator that an ARP attack may occur in the local area network 120, so that the network administrator could adopt adequate actions before the problem gets worse.

On the contrary, if the analyzing result of the processor 210 in the operation 360 is that the received network address resolution packet is a valid packet, the processor 210 performs an operation 390 to update the ARP information stored in the storage medium 118 according to the received network address resolution packet, and updates the column 410 and column 420 of the connection recording table 400 as well.

Figure 7:
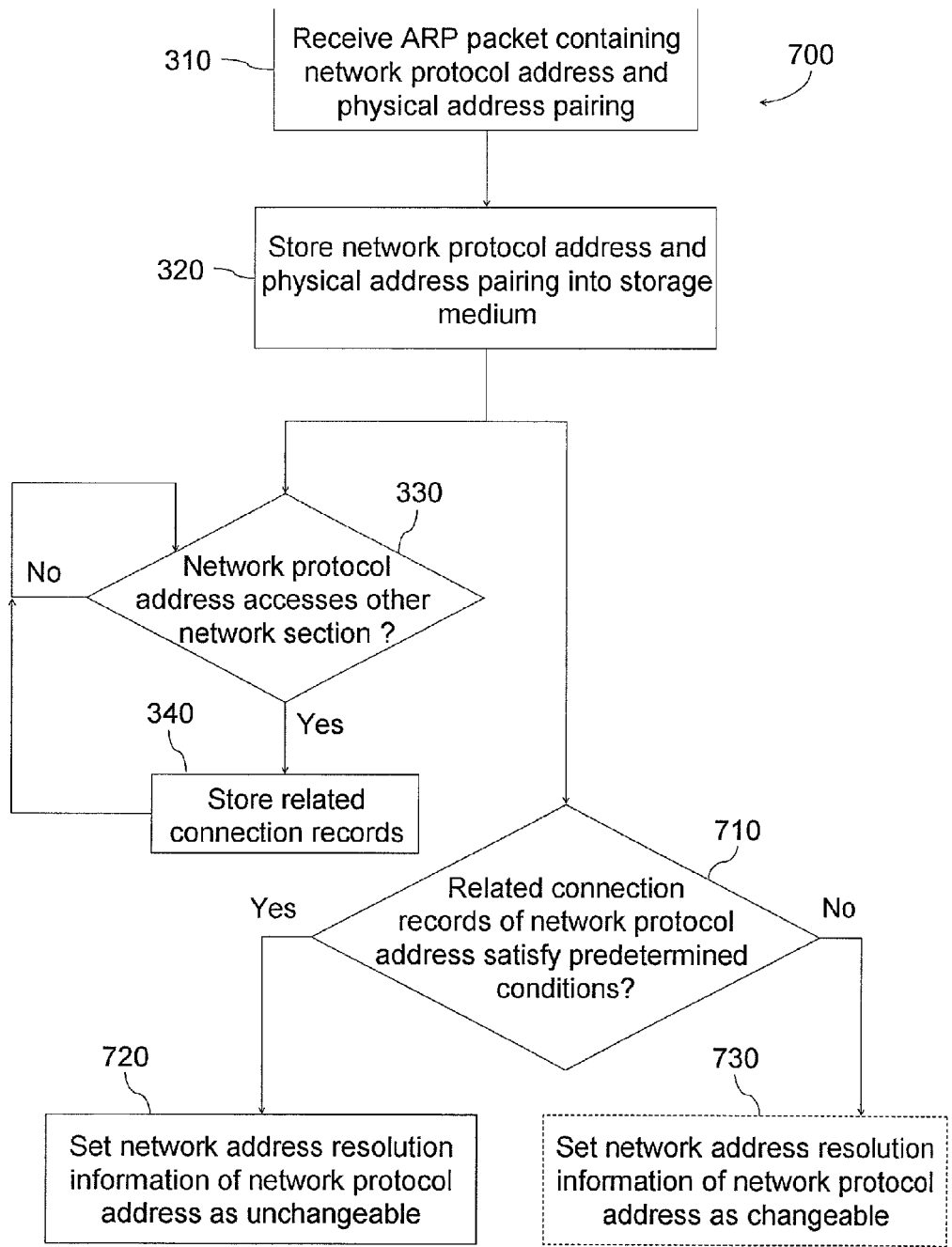
FIG. 7 is a flowchart illustrating a method for managing network address resolution information in accordance with another exemplary embodiment.

Please refer to FIG. 7, which shows a flowchart 700 illustrating the method for managing network address resolution information in accordance with another exemplary embodiment. The operations 310 through 340 of the flowchart 700 are similar to the operations 310 through 340 of the aforementioned flowchart 300, and thus repeated descriptions are omitted here for the sake of brevity.

In an operation 710, the processor 210 of the control circuit 112 analyzes whether related connection record of each network protocol address stored in the connection recording table 400 satisfies one or more predetermined conditions corresponding to the user behavior pattern of normal network utilization. The operation 710 is similar to the operation 360 described previously, and the difference between the operation 710 and the operation 360 is in the executing timing. In the aforementioned flowchart 300, the processor 210 performs the operation 360 when the network address resolution information contained in a received network address resolution packet is inconsistent with the existing record stored in the routing device 110. In the flowchart 700, the processor 210 periodically performs the operation 710 no matter whether any network address resolution packet is received at that time. As described previously, the processor 210 may continuously perform the operations 330 and 340 to update the content of the connection recording table 400. Therefore, the processor 210 of this embodiment may periodically analyze and examine each entry of the connection recording table 400 to determine whether related connection records of each network protocol address satisfy the predetermined conditions corresponding to the user behavior pattern of normal network utilization.

If the processor 210 in the operation 710 detected that the related connection records of a specific network protocol address satisfy the predetermined conditions corresponding to the user behavior pattern of normal network utilization, the processor 210 proceeds to an operation 720.

In the operation 720, the processor 210 set the network address resolution information of the specific network protocol address stored in the storage medium 118 as unchangeable to avoid the network address resolution information from being destroyed by the ARP attacks. For example, in some operation systems the processor 210 could set the type of the network address resolution information as static, so that the network address resolution information can not be modified by other programs of the routing device 110. In other words, within the period at which the related connection records of the specific network protocol address can pass the validity examination of the operation 710, no ARP attack can poison the existing entry of network address resolution information of the specific network protocol address stored in the routing device 110.

In one embodiment, if the processor 210 in the operation 710 detected that the related connection records of a specific network protocol address does not satisfy the predetermined conditions corresponding to the user behavior pattern of normal network utilization, and the type of the network address resolution information of the specific network protocol address was set as unchangeable, the processor 210 performs an operation 730 to set the type of the network address resolution information of the specific network protocol address as changeable. For example, in some operation systems the processor 210 could set the type of the network address resolution information of the specific network protocol address as dynamic, so that the processor 210 is allowed to update the existing entry of the network address resolution information of the specific network protocol address stored in the storage medium 118 based on the network address resolution packets received afterward.

In implementations, the two address resolution information management methods illustrated in the flowcharts 300 and 700 can be employed together. For example, the processor 210 could perform the operation 360 when receives a network address resolution packet to determine the validity of the network address resolution packet and also periodically perform the operation 710 to constantly update the ARP table stored in the storage medium 118.

It can be appreciated from the foregoing descriptions that one advantage of the routing device 110 is that the ability to recognize forged network address resolution packets is greatly improved and thereby increasing the alerting and defense capability against network address resolution protocol (ARP) attacks.

Another advantage of previous embodiments is that the routing device is able to dynamically determine whether to allow amendments to the network resolution information of respective network protocol addresses without involving the network administrator, and thus the disclosed routing device can be applied in various network environments.

Please refer to FIG. 8, which shows a flowchart 800 illustrating a method for processing network packets in accordance with an exemplary embodiment.

When the network interface 114 of the routing device 110 receives a network packet (operation 810), the processor 210 of the control circuit 112 performs an operation 820.

The operation 820 is similar to the operation 360 described previously, but is different in the executing timing. In the aforementioned flowchart 300, the processor 210 performs the operation 360 when the network address resolution information contained in a received network address resolution packet is inconsistent with the existing record stored in the routing device 110. In the flowchart 800, the processor 210 performs the operation 820 when receives a network packet.

Assuming that the network packet received by the routing device in the operation 810 is a network packet A having a source network protocol address IP_126. The processor 210 in the operation 820 analyzes whether related connection records of the network protocol address IP_126 stored in the connection recording table 400 satisfy the predetermined conditions corresponding to the user behavior pattern of normal network utilization and utilizes the analyzing result as the basis for determining the validity of the network packet A.

If the processor 210 in the operation 820 detected that the related connection records of the source network protocol address IP_126 of the network packet A does not satisfy the predetermined conditions corresponding to the user behavior pattern of normal network utilization, the processor 210 determines that the network packet A is an invalid network packet and performs an operation 830 to discard the network packet A.

If the related connection records of the source network protocol address IP_126 of the network packet A satisfy the predetermined conditions corresponding to the user behavior pattern of normal network utilization, the processor 210 performs further processes on the network packet A. In one embodiment, for example, the processor 210 performs an operation 840 and subsequent operations on the network packet A.

In the operation 840, the processor 210 read the value of the destination network protocol address field of the network packet A to determine whether the destination of the network packet A is within the network section handled by the routing device 110 or is addressed to other network section 130.

If the destination network protocol address of the network packet A is addressed to another network protocol address in the same network section (which is assumed the network protocol address IP_122 here), the processor 210 proceeds to an operation 850.

In the operation 850, the control circuit 112 transmits the network packet A toward a destination device corresponding to the physical address MAC_122, i.e., the terminal device 122 within the local area network 120 via the network interface 114. In some embodiments, the processor 210 may perform predetermined processes, such as virus scanning, packet filtering, or other treatments of the application layer, on the network packet A before conducts the operation 850.

In one embodiment, if the processor 210 in the operation 840 detected that the destination network protocol address of the network packet A is addressed to a destination device (assuming its network protocol address is IP_WAN) of other network section 130, the processor 210 proceeds to an operation 860 no matter whether the destination physical address of the network packet A is the physical address MAC_110 of the routing device 110. If the processor 210 detected that the destination physical address of the network packet A is not the physical address MAC_110 of the routing device 110, the processor 210 determines that the source device of the network packet A (i.e., the terminal device 126 in this case) is affected by ARP attacks. The processor 210 may issue a warning notice to the network administrator based on predetermined security rules of the control circuit 112.

In the operation 860, the processor 210 changes the content of the destination physical address field of the network packet A to the physical address MAC_110 of the routing device 110 to generate an intermediate network packet A'.

In the operation 870, the processor 210 checks the routing information stored in the storage medium 118 to find out a corresponding routing rule and a corresponding next hop for the network protocol address IP_WAN.

In an operation 880, the processor 210 generates a network packet B to be transmitted based on the intermediate network packet A'. In implementations, the processor 210 may simply utilize the payload of the intermediate network packet A' as the payload of the network packet B to be transmitted. Alternatively, the processor 210 may perform predetermined processes, such as virus scanning, packet filtering, or other treatments of the application layer, on the payload of the intermediate network packet A', and utilizes the resulted data as the payload of the network packet B. In addition, the processor 210 further set the destination network protocol address of the network packet B as identical to the destination network protocol address IP_WAN of the intermediate network packet A' (or the network packet A), and fills in the source physical address field of the network packet B with the physical address MAC_110 of the routing device 110. In other words, the processor 210 generates the network packet B having a destination network protocol address identical to the destination network protocol address IP_WAN of the network packet A and having a source physical address identical to the physical address MAC_110 of the routing device 110 in the operation 880.

Then, the processor 210 performs an operation 890 to transmit the network packet B toward the next hop via the network interface 116.

Please note that the order of the operations in the flowchart 800 is merely an example rather than a restriction of the practical implementations. For example, the operation 820 the operation 840 can be swapped or can be performed concurrently. In addition, the operation 860 may be omitted.

It can be appreciated from the above descriptions that when the routing device 110 detected that the destination network protocol address of the network packet A is addressed to other network section (such as Internet), the processor 210 of the routing device 110 would not discard the network packet A as long as the related connection records of the source network protocol address IP_126 of the network packet A satisfy the predetermined conditions corresponding to the user behavior pattern of normal network utilization, even if the destination physical address field of the network packet A is filled with an incorrect address due to the ARP attack. Instead, the processor 210 would continuously perform routing process for the network packet A to convert it into the network packet B and then transmits the network packet B to the correct route, so that the communication between the terminal device 126 and other network section (such as the Internet) will not be interrupted by the ARP attacks.

Another advantage of the routing device 110 is that it is able to rapidly determine whether a received network packet is valid by simply analyzing the related connection records of the source network protocol address and then decides the following actions accordingly but needs not to consume considerable computing resource to exam the payload of the received network packet. As a result, the network security can be effectively improved.

Another advantage of the routing device 110 is that the routing device 110 is able to maintain the terminal devices' communications with other network sections even if the terminal devices' network address resolution information was poisoned by ARP attacks. Therefore the threats of the ARP attacks can be effectively reduced.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A control circuit for use in a routing device, the control circuit comprising:
an input and output interface; and
a processor coupled with the input and output interface;
wherein when the processor received a network address resolution packet containing network address resolution information of a network protocol address of a first network section different from that recorded in the routing device, the processor does not update the network address resolution information of the network protocol address if the network protocol address has at least once accessed other network sections and satisfies a predetermined condition;
wherein the predetermined condition is selected from a group consisting of:
(a) the time at which the network address resolution packet is received is less than a predetermined time length away from the time at which the network protocol address last accessed other network sections;
(b) the network protocol address accesses other network sections at a connection frequency that reaches a predetermined frequency; and
(c) the network protocol address previously accessed other network section through a physical connection port through which the network address resolution packet is received.

2. The control circuit of claim 1, wherein the processor issues a notice message indicating that an ARP attack occurs if the network protocol address satisfies the predetermined condition.

3. The control circuit of claim 1, wherein said other network sections comprise Internet.

4. The control circuit of claim 1, wherein the processor sets the network address resolution information of the network protocol address as unchangeable if the network protocol address satisfies the predetermined condition.

5. A control circuit for use in a routing device, the control circuit comprising:
an input and output interface; and
a processor coupled with the input and output interface for setting network address resolution information of a network protocol address of a first network section as unchangeable if the network protocol address has accessed other network sections more than once and complies with a predetermined condition;
wherein the predetermined condition is selected from a group consisting of:
(a) the time at which a network address resolution packet corresponding to the network protocol address is received is less than a predetermined time length away from the time at which the network protocol address last accessed other network sections;
(b) the network protocol address accesses other network sections at a connection frequency that reaches a predetermined frequency;
(c) the network protocol address has accessed other network sections for a predetermined times or more; and
(d) the network protocol address previously accessed other network section through a physical connection port through which the network address resolution packet is received.

6. The control circuit of claim 5, wherein the processor sets the network address resolution information of the network protocol address as changeable if the network protocol address does not satisfy the predetermined condition.

7. The control circuit of claim 5, wherein when the processor receives a first network packet, if the first network packet has a source network protocol address identical to the network protocol address, a destination network protocol address addressed to a second network section, and the network protocol address satisfies the predetermined condition, the processor generates a second network packet having a destination network protocol address identical to that of the first network packet and having a source physical address identical to a physical address of the routing device.

8. A routing device, comprising:
a control circuit for, when receiving a first network packet, generating a second network packet having a destination network protocol address identical to that of the first network packet and having a source physical address identical to a physical address of the routing device if the first network packet has a source network protocol address within a first network section, a destination network protocol address addressed to a second network section, and a destination physical address different from the physical address of the routing device, and the source network protocol address satisfies a predetermined condition;
wherein the predetermined condition is selected from a group consisting of:
(a) the time at which the first network packet is received is less than a predetermined time length away from the time at which the source network protocol address last accessed other network sections;
(b) the source network protocol address accesses other network sections at a connection frequency that reaches a predetermined frequency;
(c) the source network protocol address has accessed other network sections for a predetermined times or more; and
(d) the source network protocol address previously accessed other network section through a physical connection port through which the first network packet is received.

9. A routing device, comprising:
a storage medium; and
a processor coupled with the storage medium, for analyzing whether related connection record between a network protocol address and Internet satisfies a predetermined condition, and determining the validity of a received packet corresponding to the network protocol address based on the analyzing result;
wherein the predetermined condition is selected from a group consisting of:
(a) the time at which the received packet is received is less than a predetermined time length away from the time at which the network protocol address last accessed other network sections;
(b) the network protocol address accesses other network sections at a connection frequency that reaches a predetermined frequency;
(c) the network protocol address has accessed other network sections for a predetermined times or more; and
(d) the network protocol address previously accessed other network section through a physical connection port through which the received packet is received.

10. The routing device of claim 9, wherein the packet is a network packet whose source network protocol address is the network protocol address and the processor determines that the network packet is valid if the related connection record satisfies the predetermined condition.

11. The routing device of claim 9, wherein the packet is a network address resolution packet whose sender network protocol address is the network protocol address and the processor determines that the network address resolution packet is invalid if the related connection record satisfies the predetermined condition.

12. The routing device of claim 9, wherein the packet is a network address resolution packet whose sender network protocol address is the network protocol address and containing network address resolution information of the network protocol address different from that stored in the storage medium, and the processor determines that the network address resolution packet is invalid if the related connection record satisfies the predetermined condition.

13. The routing device of claim 9, wherein the processor sets the network address resolution information of the network protocol address stored in the storage medium as unchangeable when the related connection record satisfies the predetermined condition.

14. The routing device claim 13, wherein the processor sets the network address resolution information of the network protocol address stored in the storage medium as changeable if the related connection record does not satisfy the predetermined condition.

15. The routing device of claim 9, wherein the processor sets the network address resolution information of the network protocol address stored in the storage medium as changeable if the related connection record does not satisfy the predetermined condition.

16. The routing device of claim 9, wherein the network protocol address is within a first network section and the packet is a first network packet whose source network protocol address is the network protocol address, and having a destination network protocol address addressed to a second network section and a destination physical address different from a physical address of the routing device, and the processor generates a second network packet having a destination network protocol address identical to that of the first network packet and having a source physical address identical to the physical address of the routing device if the related connection record satisfies a predetermined condition.

* * * * *